(12) United States Patent
Malloy et al.

(10) Patent No.: US 7,570,669 B2
(45) Date of Patent: Aug. 4, 2009

(54) SYNCHRONIZING PACKET TRACES

(75) Inventors: Patrick J. Malloy, Washington, DC (US); Antoine D. Dunn, San Mateo, CA (US)

(73) Assignee: OPNET Technologies, Inc., Bethesda, MD (US)

( * ) Notice: Subject to any disclaimer, the term of this patent is extended or adjusted under 35 U.S.C. 154(b) by 950 days.

(21) Appl. No.: 10/914,603

(22) Filed: Aug. 9, 2004

(65) Prior Publication Data

US 2005/0030979 A1 Feb. 10, 2005

Related U.S. Application Data

(60) Provisional application No. 60/493,647, filed on Aug. 8, 2003.

(51) Int. Cl.
*H04J 3/06* (2006.01)

(52) U.S. Cl. .................... 370/516; 370/503; 370/507; 375/356; 709/248; 713/400; 713/500; 713/502

(58) Field of Classification Search ............ 370/516, 370/503, 507; 375/356; 709/248; 713/400, 713/500, 502
See application file for complete search history.

(56) References Cited

U.S. PATENT DOCUMENTS

| | | | | | |
|---|---|---|---|---|---|
| 5,550,873 | A * | 8/1996 | Dolev et al. | ................. | 375/354 |
| 5,566,180 | A * | 10/1996 | Eidson et al. | ............... | 370/473 |
| 6,002,687 | A * | 12/1999 | Magee et al. | ............... | 370/394 |
| 6,199,170 | B1 * | 3/2001 | Dietrich | ...................... | 713/400 |
| 6,661,810 | B1 * | 12/2003 | Skelly et al. | ................. | 370/516 |
| 6,751,573 | B1 * | 6/2004 | Burch | ......................... | 702/178 |
| 6,760,328 | B1 * | 7/2004 | Ofek | ........................... | 370/389 |
| 6,865,686 | B1 * | 3/2005 | Krause et al. | ............... | 713/400 |
| 6,922,417 | B2 * | 7/2005 | Vanlint | ...................... | 370/503 |
| 7,114,091 | B2 * | 9/2006 | Vrancic | ....................... | 713/400 |
| 7,180,915 | B2 * | 2/2007 | Beyer et al. | ................. | 370/516 |
| 7,263,626 | B2 * | 8/2007 | Kero et al. | ................... | 713/400 |
| 7,366,205 | B2 * | 4/2008 | Arnold et al. | ............... | 370/503 |

* cited by examiner

*Primary Examiner*—Ricky Ngo
*Assistant Examiner*—Luat Phung
(74) *Attorney, Agent, or Firm*—Robert M. McDermott, Esq.

(57) ABSTRACT

A system and method for determining a common time base among nodes in a network by iteratively propagating timing constraints among the nodes, and determining a time-shift to apply to the time base of each node that conforms to these constraints. "Trace" files record the time of transmission or reception of packets at each node, based on the time base at the node. A fundamental constraint in a common time-based system is that the time of reception of a packet at a destination node cannot be prior to the time of transmission of the packet from a source node. A further constraint in a common time-based system is that the time of reacting to an event cannot be prior to the time of the event. By concurrently tracing traffic among multiple nodes in a network and subsequently processing the trace files to assure that each packet's transmission occurs prior to its reception, and that each reaction packet occurs after its corresponding causal packet, a correspondence between each node's time base and the common time base can be determined.

44 Claims, 5 Drawing Sheets

| TIME | N | ID |
|---|---|---|
| 00050 | AB | 79 |
| 00154 | BA | 32 |
| 00174 | AB | 48 |
| 00348 | AD | 83 |
| 00450 | DA | 44 |
| 00473 | AD | 97 |
| 00550 | BA | 23 |
| 00572 | AB | 13 |
| 00760 | DA | 87 |
| 00791 | AD | 62 |

FIG. 3A

| TIME | N | ID |
|---|---|---|
| 00075 | AB | 79 |
| 00102 | BA | 32 |
| 00198 | AB | 48 |
| 00214 | BC | 26 |
| 00460 | CB | 54 |
| 00498 | BA | 23 |
| 00599 | AB | 13 |
| 00622 | BD | 73 |
| 00686 | DB | 37 |
| 00812 | BD | 13 |

FIG. 3B

| TIME | N | ID |
|---|---|---|
| 00296 | BC | 26 |
| 00470 | CB | 54 |
| 00609 | DC | 88 |
| 00723 | CD | 33 |

FIG. 3C

| TIME | N | ID |
|---|---|---|
| 00410 | AD | 83 |
| 00440 | DA | 44 |
| 00550 | AD | 97 |
| 00577 | DC | 88 |
| 00650 | BD | 73 |
| 00674 | DB | 37 |
| 00723 | CD | 33 |
| 00752 | DA | 87 |
| 00842 | BD | 13 |
| 00851 | AD | 62 |

| AB | | BC | | BD | | AD | | DC | |
|---|---|---|---|---|---|---|---|---|---|
| ELB | EUB | ELB | EUB | ELB | EUB | ELB | EUB | ELB | EUB |
| -24 | 52 | -82 | -10 | -28 | 12 | -60 | 8 | -32 | 0 |

| BA | | CB | | DB | | DA | | CD | |
|---|---|---|---|---|---|---|---|---|---|
| ELB | EUB | ELB | EUB | ELB | EUB | ELB | EUB | ELB | EUB |
| -52 | 24 | 10 | 82 | -12 | 28 | -8 | 60 | 0 | 32 |

| | A | | | B | | | C | | | D | | |
|---|---|---|---|---|---|---|---|---|---|---|---|---|
| | VLB | VUB | VTS | VLB | VUB | VTS | VLB | VUB | VTS | VLB | VUB | VTS |
| Init | -999 | 999 | ? | -999 | 999 | ? | -999 | 999 | ? | -999 | 999 | ? |
| A | 0 | 0 | 0 | -999 | 999 | ? | -999 | 999 | ? | -999 | 999 | ? |
| AB | 0 | 0 | 0 | -24 | 52 | ? | -999 | 999 | ? | -999 | 999 | ? |
| AD | 0 | 0 | 0 | -24 | 52 | ? | -999 | 999 | ? | -60 | 8 | ? |
| BA | 0 | 0 | 0 | -24 | 52 | ? | -999 | 999 | ? | -60 | 8 | ? |
| BC | 0 | 0 | 0 | -24 | 52 | ? | -106 | 42 | ? | -60 | 8 | ? |
| BD | 0 | 0 | 0 | -24 | 52 | ? | -106 | 42 | ? | -52 | 8 | ? |
| DA | 0 | 0 | 0 | -24 | 52 | ? | -106 | 42 | ? | -52 | 8 | ? |
| DB | 0 | 0 | 0 | -24 | 36 | ? | -106 | 42 | ? | -52 | 8 | ? |
| DC | 0 | 0 | 0 | -24 | 36 | ? | -84 | 8 | ? | -52 | 8 | ? |

(CB, CD, BA, BC, BD)

| | A | | | B | | | C | | | D | | |
|---|---|---|---|---|---|---|---|---|---|---|---|---|
| B | 0 | 0 | 0 | 6 | 6 | 6 | -84 | 8 | ? | -52 | 8 | ? |
| BA | 0 | 0 | 0 | 6 | 6 | 6 | -84 | 8 | ? | -52 | 8 | ? |
| BC | 0 | 0 | 0 | 6 | 6 | 6 | -76 | -4 | ? | -52 | 8 | ? |
| BD | 0 | 0 | 0 | 6 | 6 | 6 | -76 | -4 | ? | -22 | 8 | ? |

(CB, CD, DA, DB)

| DC | 0 | 0 | 0 | 6 | 6 | 6 | -54 | -4 | ? | -22 | 8 | ? |

(CB, CD)

| C | 0 | 0 | 0 | 6 | 6 | 6 | -29 | -29 | -29 | -22 | 8 | ? |
| CB | 0 | 0 | 0 | 6 | 6 | 6 | -29 | -29 | -29 | -22 | 8 | ? |
| CD | 0 | 0 | 0 | 6 | 6 | 6 | -29 | -29 | -29 | -22 | 3 | ? |

(DA, DB, DC)

| D | 0 | 0 | 0 | 6 | 6 | 6 | -29 | -29 | -29 | -9.5 | -9.5 | -9.5 |

SYNCHRONIZING PACKET TRACES

This application claims the benefit of U.S. provisional patent application 60/493,647, filed 8 Aug. 2003.

BACKGROUND AND SUMMARY OF THE INVENTION

This invention relates to the field of systems analysis, and in particular to a method and system for synchronizing records of packet transactions among multiple communications devices.

As the complexity of computer and communication networks continually increases, the need for tools and methods for effectively and efficiently analyzing the performance of such networks also increases.

Traffic monitoring devices, commonly called "sniffers", have been used for many years to facilitate the diagnosis of communication problems and anomalies. Such monitors provide a record of all of the messages/packets that arrive or depart via a communication channel of a communications device to which they are attached. These monitors also typically record the state of the communication channel. The record, "log", or "trace" of received or transmitted packets and the ongoing state of the communication channel often provides diagnostic insight into the operation of the communications device and/or the communication channel to which it is attached.

As used herein, the term "communications device" encompasses any device that transmits or receives signals from another device, and includes terminal devices, such as a computer or other device that originates transmissions or absorbs receptions, as well as a relay device, such as a router or other device that receives information from one device and forwards the information to another device, as well as a processing device that receives information from one device and forwards other information, based on the received information, to the originating device or another device.

Network analysis systems, which may include a network simulator, a queuing model system, and the like, are commonly used to analyze the performance of a network that includes the communication channels between and among the aforementioned communications devices. Typically, such network analysis systems require a model of a given network, as well as the performance characteristics of the devices and communication paths that form the network. A significant characteristic of a communication path is the delay that is incurred as a message travels along the path; such delay may include transmission, processing, congestion, and other delays that are introduced along the path. If each of the devices along a path, and each of the links between devices along the path, are accurately characterized, an accurate estimate of the time it may take to send a message from any device on the path to any other device on the path can be determined. Consider, for example, sending a request from a client device to a server for information that is contained in a remote database. The expected time between sending the request and receiving the information can be determined based on the cumulative processing time at each node in the path of the request and response, and the cumulative propagation time for communicating the information between each of the nodes in the path of the request and response.

Of particular note in this invention are the propagation time delays between transmitting an item from one device and receiving the item at another device. Although systems and devices are available for monitoring communication traffic at each node in a network, the determination of the difference in the time of transmission from a source and the time of receipt at a destination requires that the clocks at the source and the destination have a common time base. The problem of determining propagation time delays is further complicated by increasingly common use of firewalls and other message buffering schemes that effectively isolate sub-networks within a network, thereby disassociating the time bases in each sub-network.

It is an object of this invention to provide a system and method for determining a correspondence among clocks in a multi-node system. It is a further object of this invention to provide a system and method for determining the correspondence among clocks in a multi-node system based on independently monitored traffic at each node. It is a further object of this invention to provide a system and method for associating disassociated time bases in a network. It is a further object of this invention to provide a system and method that provides accurate/feasible estimates of propagation delay times between nodes in a system.

These objects, and others, are achieved by a system and method that iteratively propagates timing constraints among a plurality of nodes in a network, and determines a common time base among the nodes that conforms to these constraints. "Trace" files record the time of transmission or reception of packets at each node, based on a time base at the node. A fundamental constraint in a common time-based system is that the time of reception of a packet at a destination node cannot be prior to the time of transmission of the packet from a source node. A further constraint in a common time-based system is that the time of reacting to an event cannot be prior to the time of the event. By concurrently tracing traffic among multiple nodes in a network and subsequently processing the trace files to assure that each packet's transmission occurs prior to its reception, and that each reaction packet occurs after its corresponding causal packet, a correspondence between each node's time base and the common time base can be determined.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
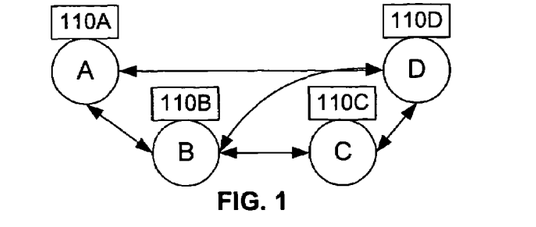
FIG. 1 illustrates an example network with traffic monitoring devices in accordance with this invention.

FIG. 1 illustrates an example network comprising nodes A, B, C, and D, each with traffic monitoring devices 110A-D. Although each traffic monitoring device 110 is illustrated as a discrete component in FIG. 1, it may be a software program that runs on the system that sends or receives traffic to and from other nodes, such as provided in the "ACE" traffic analysis system from OPNET, Inc., Bethesda, Md., "Network Monitor" from MicroSoft, Inc., Seattle, Wash., and so on. Stand-alone traffic monitoring devices 110 include, for example, the "Sniffer" system from Network Associates, Inc., Santa Clara, Calif. The traffic monitoring devices 110 record traffic events, including the transmission and reception of packets, and the time of the event, based on the time base used by the traffic monitoring device 110. Some or all of the time bases of the devices 110 are assumed herein to be independent of the other devices 110.

For ease of understanding, the network that is illustrated in FIG. 1 does not include any disassociated nodes. Also for ease of understanding, the analysis presented with regard to FIGS. 1 through 5 does not include causal-reaction constraints. These aspects are presented hereinafter with regard to FIGS. 6 and 7.

Figure 2:
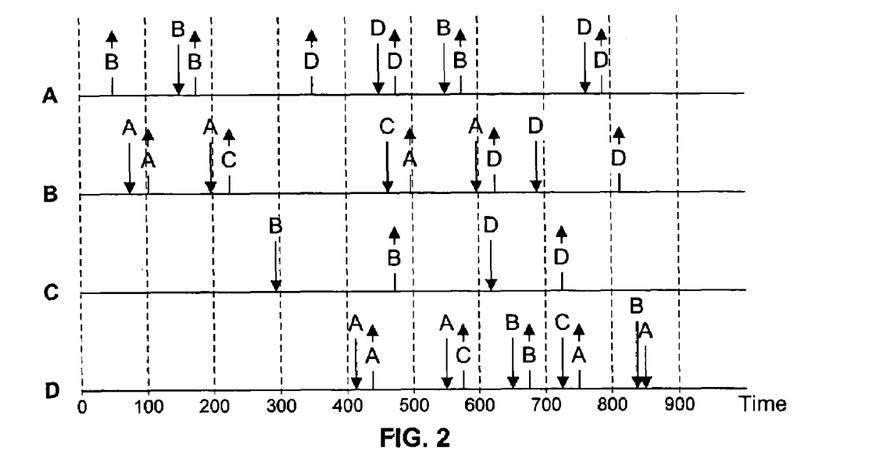
FIG. 2 illustrates an example timing diagram of sample traffic among multiple nodes.

FIG. 2 illustrates example traffic among the nodes A, B, C, and D, and FIGS. 3A-3D illustrate example "trace" files collected by the traffic monitoring devices 110 at nodes A, B, C, and D, respectively. For the purposes of this invention, the messages forming the traffic among the nodes are termed "packets", as a generic term for a unit of transmitted information, and the records of transmitted or received packets are termed "traces". One of ordinary skill in the art will recognize that the principles of this invention are applicable regardless of the form, content, or variability of the message units, and includes, for example, both analog and digital message units, fixed and variable message unit lengths, and so on, and that the form of recording the occurrences of transmissions and receptions is immaterial to the principles of this invention.

Figure 3A:
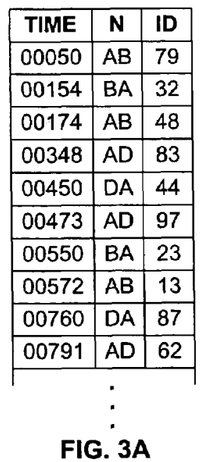
FIGS. 3A-3D illustrates example trace files at each node of the example network.
Figure 3B:
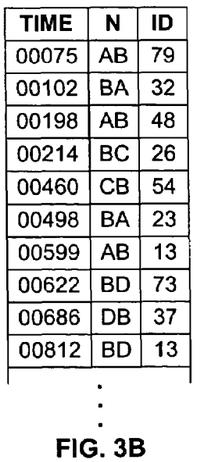
Figure 3C:
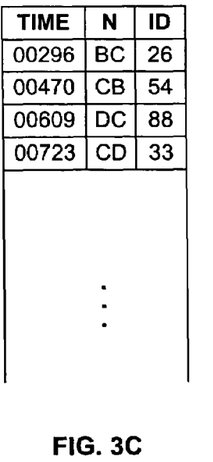
Figure 3D:
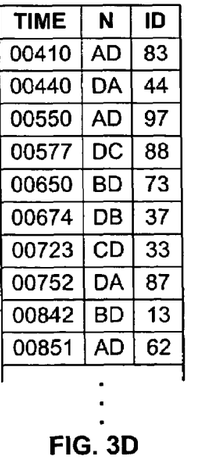

At time 50, as measured by the device 110A, node A transmits a packet to node B, as indicated by an upward arrow marked "B" on the line A of FIG. 2. At time 75, as measured by the device 110B, node B receives this packet, as indicated by a downward arrow marked "A" on the line B of FIG. 2. The device 110A records the transmission event in the illustrated trace file of FIG. 3A, with an identification of the transmitted packet. The identification of the packet typically includes an identification of the source and destination nodes and other information that facilitates recognition of the particular packet, such as a packet ID, a copy of the initial data bytes in the packet, or other item. The first entry in the trace file of FIG. 3A is identified as packet AB-79, the "79" being an example identifier. The first entry in the trace file of FIG. 3B is also identified as packet AB-79, thus establishing a correspondence between the packet transmitted from node A at time 50 to the packet received at node B at time 75.

At time 102, as measured by device 110B, node B transmits a packet to node A. At time 154, measured by device 110A, node A receives the packet from node B. Because the identifiers of the packets, BA-32, correspond, the correspondence between this transmit-receive pair is established.

Note that although the correspondence between transmitted packets and received packets is determined in these examples based upon corresponding identifiers in each trace file, other techniques may be used to associate a transmitted packet to a received packet. For example, if intermediate, non-monitored, nodes exist between monitored nodes, the above referenced identifiers that identify the source and destination of each link may not correspond between nodes that are separated by one or more non-monitored nodes, thereby disassociating the source and destination of the link. In a preferred embodiment of this invention, alternative techniques for 'pairing' transmissions in one trace file with receptions in another trace file are provided. For example, if an application-specific analysis is being monitored, wherein a user is cognizant of a source node and one or more destination nodes, but is not aware of intermediate nodes, if any, the user may monitor the source and destination nodes and then manually identify the correspondence between each transmission-reception pair. In like manner, a variety of techniques may be used to establish each transmission-reception pair by comparing the contents of transmitted and received messages. Such techniques are particularly effective for matching transmission-reception pairs that progress through a firewall that repackages individual packets, as discussed further below with regard to FIGS. 6 and 7.

As illustrated in FIGS. 2 and 3, three transmissions occur from node A to node B (AB-79, AB-48, AB-13), at times 50, 174, and 572, as measured by device 110A, which are received at node B at times 75, 198, and 599, as measured by device 110B. Based on these samples, it might appear that the propagation delay between node A and node B is approximately 25 time units. However, the transmissions from node B to node A (BA-32, BA-23), at times 102 and 498, are received at A at times 154 and 550, implying that the propagation delay between node B and node A is approximately 52 time units. Assuming symmetry in the transmission paths from A to B and B to A, this discrepancy between propagation times can be attributed to a difference between the time bases of the devices 110A and 110B. That is, if the time base of device 110A is selected as the common time base, the times registered by device 110B can be each incremented by 13.5 time units to provide an average propagation delay of 38.5 between nodes A and B in each direction. However, an adjustment of node B's time base may introduce inconsistencies between node B's adjusted times and the time bases of nodes C and D. Further, a lack of symmetry may actually be present between the transmission paths in each direction, and adjusting the time base based solely on symmetry may not provide for a consistent or feasible solution. An infeasible solution, for example, would be an adjustment of the time bases that results in a packet's received time being prior its transmitted time.

In accordance with a first aspect of this invention, the range of each time base adjustment is constrained so as to assure that no packet appears to be received prior to being transmitted based on the common time base.

In the example of nodes A and B, the recorded propagation times of the three packets (AB-79, AB-48, AB-13) from node A to node B are 25 (75−50), 24 (198−174), and 27 (599−572). An adjustment of the time base of node B by more than −24 time units would result in the adjusted receipt time at node B of the second packet to be less than 174, before its transmission from node A. Thus, a lower bound to the adjustment of node B's time base relative to node A's time base is −24. Similarly, the recorded propagation times of the two packets (BA-32, BA-23) from node B to node A are each 52 ((154−102) and (550−498)). An adjustment of node B's time base of more than 52 would result in an adjusted transmit time at node B of both packets after their receipt at node A. Thus, an upper bound to the adjustment of node B's time base relative to node A's time base is +52. Based on the same analysis, the adjustment of node A's time base relative to node B's time base is bound between −52 and +24.

Defining each node as a vertex in a directed graph, and each communication path as an edge in the directed graph, upper (EUB) and lower (ELB) bounds for each edge of the graph can be determined as follows.

$$ELB(xy) = -\min(Ry(i) - Tx(i)), \; i = \text{all packets from } x \text{ to } y. \quad (1)$$

$$EUB(xy) = \min(Rx(i) - Ty(i)), \; i = \text{all packets from } y \text{ to } x. \quad (2)$$

Using this nomenclature:
ELB(AB)=−min((75−50), (198−174), (599−572))=−24;
EUB(AB)=min((154−102), (550−498))=+52;
ELB(BA)=−min((154−102), (550−498))=−52;
EUB(BA)=min((75−50), (198−174), (599−572))=24.

Note that the computation and storage of these bounds can be simplified by noting the complementary nature of these bounds:

$$ELB(xy) = -EUB(yx); \quad (3)$$

$$EUB(xy) = -ELB(yx). \quad (4)$$

Figure 5:
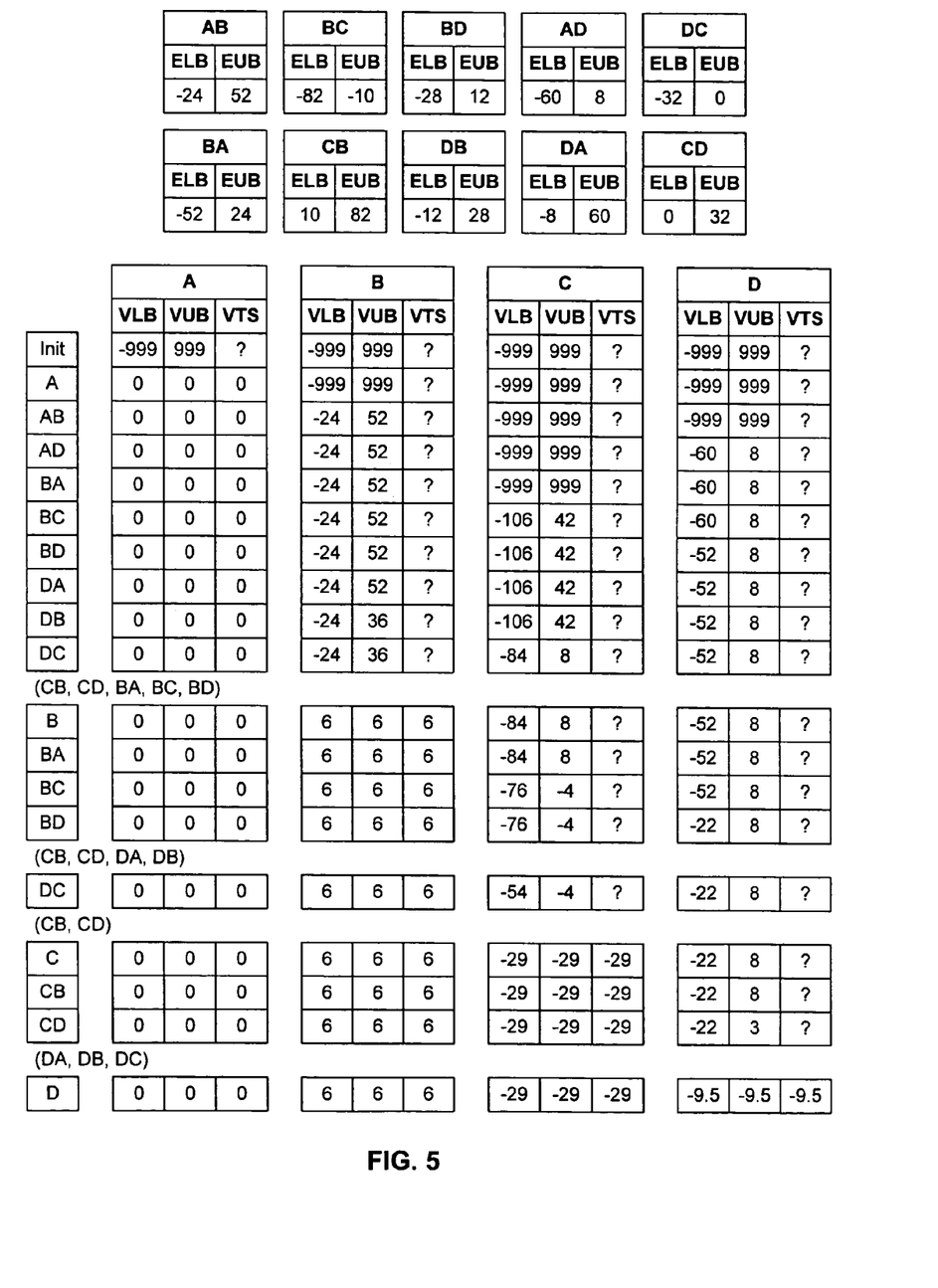
FIG. 5 illustrates the propagation of constraints based on the example traffic and traces files of FIGS. 2 and 3 in accordance with this invention.

The upper set of blocks in FIG. 5 reflect the upper and lower bounds for each of the edges AB, BC, BD, AD, and DC, and their complements, BA, CB, DB, DA, and CD, based on the example traffic flow of FIGS. 2 and 3, and equations (1) and (2), above. These edge constraints define the bounds on the adjustment of the time bases at each of the pair of nodes forming the edge, relative to the time base of the other node in the pair (hereinafter termed a "neighbor" of the node). Each node in a network will likely have multiple neighbors, and hence multiple edges associated with it. Therefore, the constraints associated with the time base at each node relative to a common time base will be a composite of the constraints imposed by each of its associated edges, relative to each of its neighbors' time bases, each of which are relative to a common time base.

In accordance with a second aspect of this invention, the constraints associated with the time base at each node relative to a common time base are determined by an iterative propagation of the constraints associated with each communication path in the network.

Figure 4:
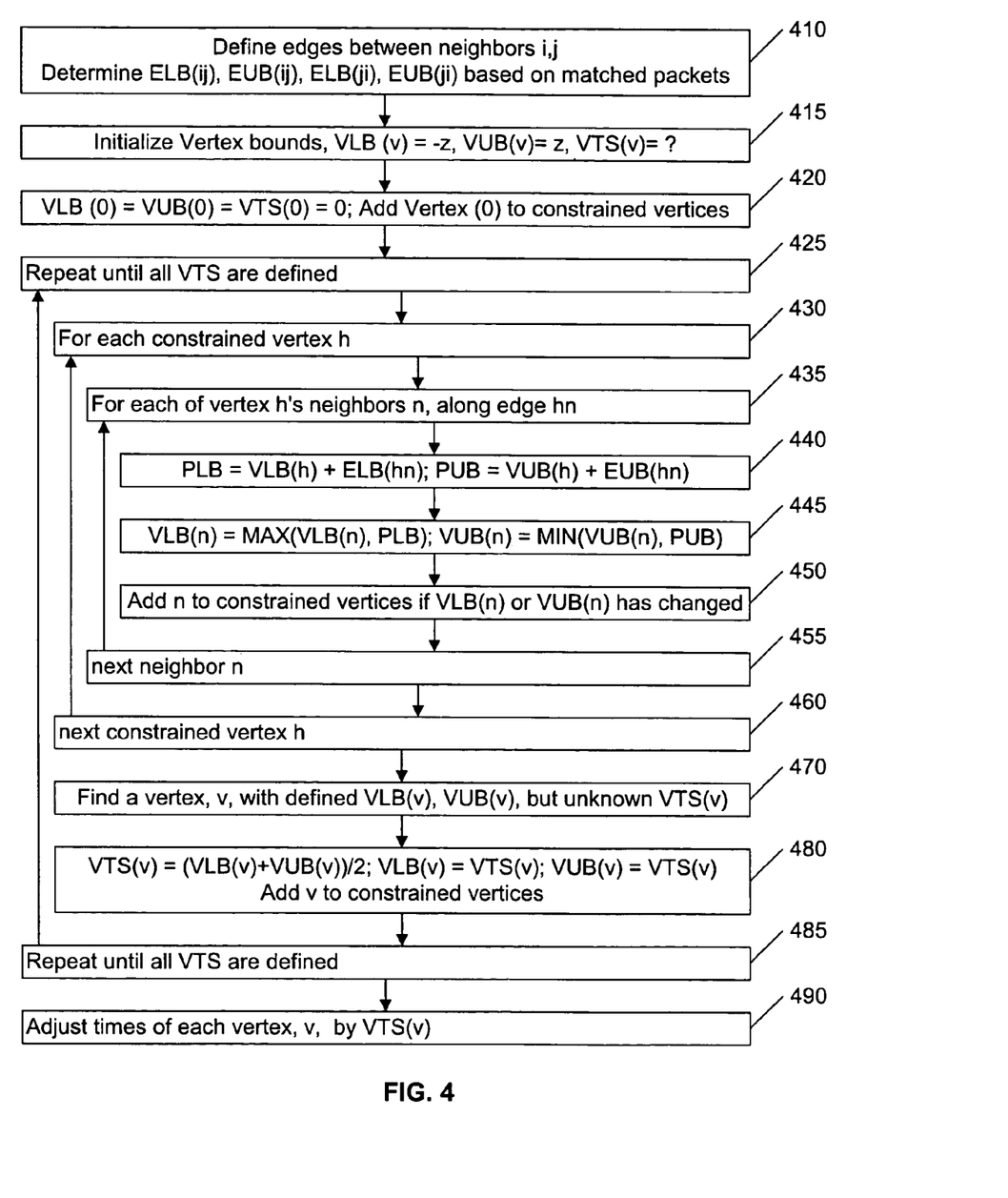
FIG. 4 illustrates an example flow diagram for propagating timing constraints among multiple nodes in a network in accordance with this invention.

FIG. 4 illustrates an example flow diagram for propagating timing adjustment constraints imposed by the individual communication paths to the nodes of the network. FIG. 5 illustrates the operation of this flow diagram when applied to the example traffic of FIGS. 2 and 3 for the network illustrated in FIG. 1. The columns of FIG. 5 that are labeled A, B, C, and D illustrate the determined constraints associated with each node A, B, C, and D of FIG. 1, as the flow diagram of FIG. 4 is executed.

The objective of the iterative process of FIG. 4 is to determine a feasible set of time-shifts that can be applied to each node's time base to achieve a common time base among the nodes in a network. The feasible set of time-shifts are based on the following equations, which constrain all transmissions to occur prior to all receptions, using a common time base:

$$TS(j) > TS(i) + ELB(ij), \text{ and} \quad (5)$$

$$TS(j) < TS(i) + EUB(ij), \quad (6)$$

for all nodes i, j having paired communications, where TS(x) is the time shift applied to node x relative to the common time base. Using the aforementioned directed graph, nodes are represented as vertices of the graph and communication paths are represented as edges. To determine a feasible time shift for a node/vertex, a lower and upper bound on the time shift (VLB, VUB) for each vertex are defined and progressively updated as the edge constraints associated with each node are successively applied.

At 410, the bounds, ELB and EUB, for each of the edges between neighboring vertices are determined, using equations (1) and (2), as discussed above. These bounds are illustrated in the aforementioned boxes in FIG. 5 labeled AB, BC, BD, AD, DC, and their complements, BA, CB, DB, DA, CD.

At 415, the vertex parameters, VLB (Vertex Lower Bound), VUB (Vertex Upper Bound), and VTS (Vertex Time Shift), are initialized for each vertex. The VLB for each node is set to a large negative number (conceptually, to negative infinity); the VUB for each node is set to a large positive number (conceptually, to positive infinity); and the VTS for each node is set to "unknown". The first row in the columns of FIG. 5 labeled A, B, C, and D, illustrate the setting of each of the vertices' bounds to −999 and +999, and its time shift to "?". The leftmost column of FIG. 5 is presented for ease of understanding, and contains a shorthand notation to identify the current step in the iterative process (the first row being identified as "init", for initial-state).

At 420, a root vertex is selected as the source of the common time base. Any vertex can be selected as the root vertex, and the subsequently determined time shifts for each other vertex will be relative to the root vertex's time base. The root vertex is defined to have a time shift of zero, and is constrained by its bounds to remain at zero. In FIG. 5, vertex A is selected as the root vertex, as illustrated by the second row, labeled "A" in the leftmost column; the bounds and time shift of the other vertices are unchanged. The root vertex is added to a list of "constrained vertices".

The loop 425-485 provides an iterative process that terminates when all of the vertex time shifts are determined.

The loop 430-460 processes the constraints imposed by each constrained vertex on its neighbors, based on the bounds associated with the vertex's time shift, and the bounds associated with each edge that connects the vertex to its neighbors, as discussed below. The loop index "h" is used to reference each constrained vertex, corresponding to the current "head" of the list of constrained vertices. As each vertex in the list is processed, it is removed from the list, thereby providing a new head, h.

The loop 435-455 processes each of the neighbors, n, of the head vertex, h, to determine if the new constraints that caused the head vertex to be placed on the list of constrained vertices has an impact on the neighbor's bounds. In the example of FIG. 5, the only vertex in the list of constrained vertices is the root node, A, and thus each of the neighbors of A, which are B and D, are processed in the loop 435-455.

At 440 a "propagated" lower bound, PLB, and upper bound, PUB, are determined for the current neighbor n of the head vertex h. The PLB is equal to the lower bound of the head vertex, VLB(h), plus the lower bound, ELB(hn), of the edge between the head vertex h and the neighbor vertex n. This propagated lower bound, PLB, is the lower bound that is associated with the neighbor n based on the propagation of the head vertex's constraint along the edge to the neighbor vertex. In like manner, the propagated upper bound, PUB, is the sum of the head vertex's upper bound, VUB(h), plus the upper bound, EUB(hn) of the edge between the head vertex h and the neighbor vertex n. The propagated bounds PLB and PUB are applied to the neighbor vertex only if these bounds further constrain the neighbor vertex, as indicated by the MIN and MAX functions, at 445. In the first iteration, each of the neighbors are unconstrained, having conceptual bounds of negative infinity and positive infinity, and thus the propagated bounds, being finite, will be applied to each of the neighbor's bounds.

If either bound on a neighbor vertex is changed, the neighbor vertex is added to the list of constrained vertices, at 450.

At 455, the loop 435-455 is repeated for each of the remaining neighbors of h.

In FIG. 5, at the next row, identified as AB in the leftmost column, the results of the processing of head vertex A and neighbor vertex B are illustrated. As discussed above with regard to equations (1) and (2), the edge constraint ELB(AB) states that node B's time base cannot be shifted by more than 24 in the negative direction relative to node A's time base. Thus, because node A is the root node and has a zero time shift relative to the "common" time base, node B's time base cannot be shifted by more than 24 in the negative direction relative to the common time base. In like manner, node B's time base cannot be shifted by more than 52 in the positive direction relative to the common time base, as indicated by the −24 and +52 entries for vertex B's VLB and VUB, respectively. Similarly, at the next row, identified as AD in the leftmost column, the results of processing the head vertex A and neighbor vertex D are illustrated, wherein vertex D's VLB and VUB are determined to be −60 and 8, respectively. Because vertex C is not a neighbor of A, its bounds are not affected by the processing of head vertex A. Because the bounds of vertices B and D have changed, both B and D are added to the list of constrained vertices.

After all of the neighbors of the head vertex are processed, at 460, the head vertex is removed from the list of constrained vertices, and, if the list is not empty, the new head of the list is processed, via a repeat of the loop 430-460.

In FIG. 5, the new head vertex is node B, and the processing of B's neighbors include the processing of nodes A, C, and D, as illustrated by the next rows BA, BC, BD. Applying the equations of blocks 440 of FIG. 4 to node A, the PLB for vertex A, based on the constraints of vertex B and the edge between vertex B and vertex C, is given as VLB(B)+ELB (BA), which, given the values in FIG. 5 at this point in the process, equals −76 (−24+−52). Similarly, the PUB for vertex A is determined to equal 76 (52+24). Because these bounds are less constraining than the current bounds of vertex A, the bounds of vertex A remain unchanged, as indicated in the row identified by BA in the leftmost column.

At the row identified by BC in the leftmost column, the results of processing head vertex B and its neighbor C is illustrated. Using the equations of blocks 440 of FIG. 4, the PLB for vertex C, based on the constraints of vertex B and the edge between node B and node C, is given as VLB(B)+ELB (BC), which, given the values in FIG. 5 at this point in the process, equals −106 (−24+−82). That is, node B's time base can be shifted in the negative direction by as much as 24 relative to the common time base, and node C's time base can be shifted in the negative direction by as much as 82 relative to node B's time base; and therefore, node C's time base can be shifted in the negative direction by as much as 106 relative to the common time base. In like manner, the PUB for vertex C is given as VUB(B)+EUB(BC), which equals 42 (52+(−10)), indicating that vertex C's time base can be shifted by as much as 42 in the positive direction relative to the common time base. Because these bounds are more constraining than the current unconstrained bounds on vertex C, vertex C's lower and upper bounds are updated to reflect these bounds, and vertex C is added to the list of constrained vertices.

When head vertex B's next neighbor, D, is processed, the PLB for vertex D is determined to be −52 (−24+−28). Because this bound is more constraining than the current lower bound for vertex D (−60), vertex D's lower bound is updated to this value, as indicated by the row identified as BD in FIG. 5. The PUB for vertex D is determined to be 64 (52+12). However, because this bound is less constraining than vertex D's upper bound (8), vertex D's upper bound is unchanged. That is, if vertex D were only constrained by vertex B and the edge between B and D, then vertex D's time base could be shifted by as much as 64 in the positive direction relative to the common time base without causing an infeasible result. However, vertex D is also constrained by vertex A and the edge between A and D to a maximum time shift of 8 relative to the common time base, and a shift of node D by more than 8 time units relative to the common time base will result in an infeasible result (packets from D to A would be determined to have arrived at A before they were transmitted from D).

Because one of vertex D's bounds have changed, vertex D is added to the list of constrained vertices. However, vertex D is already in the list of constrained vertices, and nodes on the constrained list do not need to be added to the list again.

After processing each of node B's neighbors A, C, and D, vertex B is removed from the list of constrained vertices, and the next vertex in the list, vertex D, become the head node, and its neighbors are processed, as illustrated by the next rows DA, DB, DC. Processing of vertex D's neighbor vertex A does not produce any changes to vertex A's bounds. Processing vertex D's neighbor vertex B, however, produces a PLB and PUB of −64 (−52+−12) and 36 (8+28), respectively. Because this PUB is more constraining than vertex B's current upper bound (52), vertex B's upper bound is updated, and vertex B is added to the list of constrained vertices. That is, if vertex B was solely dependent on vertex A's time shift and the edge between vertex A and B, vertex B's time shift relative to the common time base could be as high as the formerly determined value of +52; however, as determined at this stage of the iterative process, a time shift of more than +36 relative to the common time base will result in an infeasible result relative to the timing of packets between nodes B and D.

In like manner, when vertex D's neighbor C is processed, vertex C's upper bound is updated from +42 to +8, and vertex C's lower bound is updated from −106 to −84, based on the constraints of vertex D and the edge between vertex D and C, and the edge between vertex C and D, respectively. Vertex C would be added to the list of constrained vertices, but it is already in the list and need not be added again.

After processing head vertex D, vertex D is removed from the list of constrained vertices, and the next vertex in the list, vertex C, becomes the head vertex. The processing of the neighbors B and D of vertex C does not produce any changes to the bounds, and when vertex C is removed from the list of constrained vertices, vertex B becomes the new head vertex. The processing of the neighbors A, C, and D of vertex B also does not produce any changes to the bounds, and the removal of vertex B from the list of constrained vertices results in an empty list. This processing of vertices with no impact on the bounds is illustrated by the parenthesized list (CB, CD, BA, BC, BD) below the last processed row DC in FIG. 5, for brevity.

At 460 in FIG. 4, when there are no vertices in the list of constrained vertices, the loop processing 430-460 is terminated.

After processing all of the constrained vertices without producing a change to the bounds of any of the vertices, it can be stated that none of the vertices at this stage of the process constrain any of the other vertices. In order to further propagate the constraints imposed by the edges of the graph, a specific time shift is selected for any vertex that has defined bounds but an unknown time shift, at 470.

At 480, a value of the time shift of the selected vertex is selected based on the bounds associated with the node. Because none of the vertices at this stage of the process constrain any of the other vertices (otherwise the loop 430-460 would not have terminated), any value between the upper and lower bounds can be selected as the selected time shift for the selected node. In a preferred embodiment of this invention, the time shift is selected as the midpoint between the upper and lower bounds (VLB+VUB)/2. Having determined a time shift between the bounds of the selected vertex, the bounds of the selected vertex are set equal to the determined time shift, and the vertex is added to the list of constrained vertices, and the above described processing of the vertices in the list of constrained vertices is repeated.

In FIG. 5, vertex B is the selected vertex, and its time shift is set to the midpoint between its upper and lower bounds, (VLB(B)+VUB(B))/2=(−24+36)/2=6. Vertex B's bounds are also set to this time shift value, as indicated at the row identified as B in the leftmost column of FIG. 5.

Processing the neighbors A, C, and D of vertex B results in no change to the bounds of vertex A, and a change to the bounds of both vertex C and vertex D. That is, if vertex B's time base is shifted by the selected amount, 6, the time bases of vertices C and D will be more constrained than when vertex B had merely been constrained to any value between −24 and +36. Because of these modified constraints, vertices C and D are added to the list of constrained vertices.

Processing the neighbors B and D of vertex C results in no change to the bounds of vertices B and D. Processing the neighbors A, B, and C of vertex D results in no change to the bounds of vertices A and B, but it does result in a change to the bounds of vertex C. This change to the bounds of vertex C places vertex C back onto the list of constrained vertices. The processing of the neighbors B and D of vertex C results in no change to their bounds, and the list of restrained vertices is again depleted, corresponding again to an end of the loop 430-460 of FIG. 4.

Having exhausted the constraints imposed by selecting a time shift of 6 for vertex B, a time shift for another vertex with a currently undefined time shift is selected, corresponding to 470 of FIG. 4. In this example, vertex C is selected, and its time shift is set to the midpoint, −29, between its bounds of −54 and −4, corresponding to 480 of FIG. 4. The bounds on vertex C are set to this time shift value, C is placed on the list of constrained vertices, and the neighbors of vertex C are processed. Constraining C to a value of −29 has the effect of reducing the upper bound of vertex D (from +8 to +3), and vertex D is added to the list of constrained vertices. This new constraint on vertex D has no effect on its neighbors A, B, and C, and again the list of constrained vertices is depleted. Corresponding to 470-480 of FIG. 4, vertex D's time shift is selected as the midpoint −9.5 of its bounds, −22 and +3.

Returning to FIG. 4, after all of the time shifts are defined, the iterative loop 425-485 is terminated. Thereafter, at 490, by applying each determined time shift (0, 6, −29, −9.5) to the times reported by each of the vertices (A, B, C, D), each of the adjusted times will be consistent with a common time base. Note that the particular selected times reflect one set of feasible time shifts for the vertices of the network, and may not, in fact, be an accurate representation of the actual real-time differences among the time bases at each node. However, the set of time shifts determined by this invention are time shifts that provide for a feasible and consistent standardization of the times among multiple nodes in a network, so that subsequent time-based network analysis tasks can be performed, without requiring an actual synchronization of the clocks used throughout the network.

Other techniques for determining the time shifts of the nodes based on the constraints imposed by the links between nodes may also be used. For example, quadratic or linear programming techniques can be used to solve the set of inequalities presented above as equations (5) and (6) by defining an objective function that includes these time shifts and thereafter minimizing and/or maximizing the objective function.

Note that the above process assumes a 1:1 pairing of transmit-receive packets. If the original packets are bundled into a larger packet (N:1 reformatting), or separated into smaller packets (1:N reformatting), the transmission and reception times for determining the bounds on the lower and upper edge constraints will differ. For determining the lower bound (ELB), the time of transmission and reception of the first packet should be used. For determining the upper bound (EUB), the time of transmission and reception of the last packet should be used.

Figure 6:
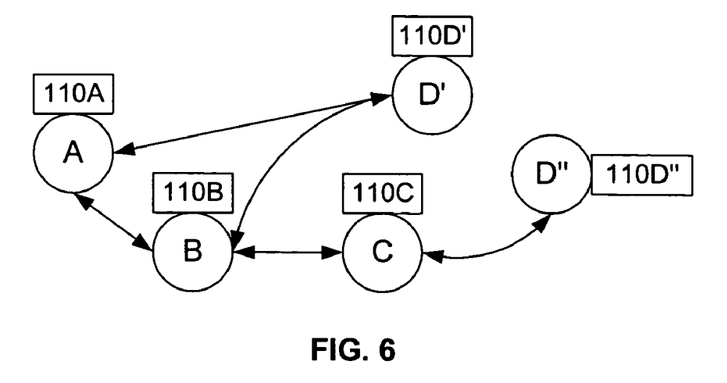
FIG. 6 illustrates another example network with traffic monitoring devices in accordance with this invention.

As noted above, networks often contain elements that have the effect of disassociating nodes and/or disassociating causal events. FIG. 6 illustrates an example network corresponding to the network of FIG. 1, except that node D of FIG. 1 is represented as two independent/disassociated nodes D' and D" in FIG. 6. Such a disassociation may occur, for example, if the node D comprises two independent network interfaces, each of which is monitored by an independent monitoring device 110D', 110D".

Figure 7:
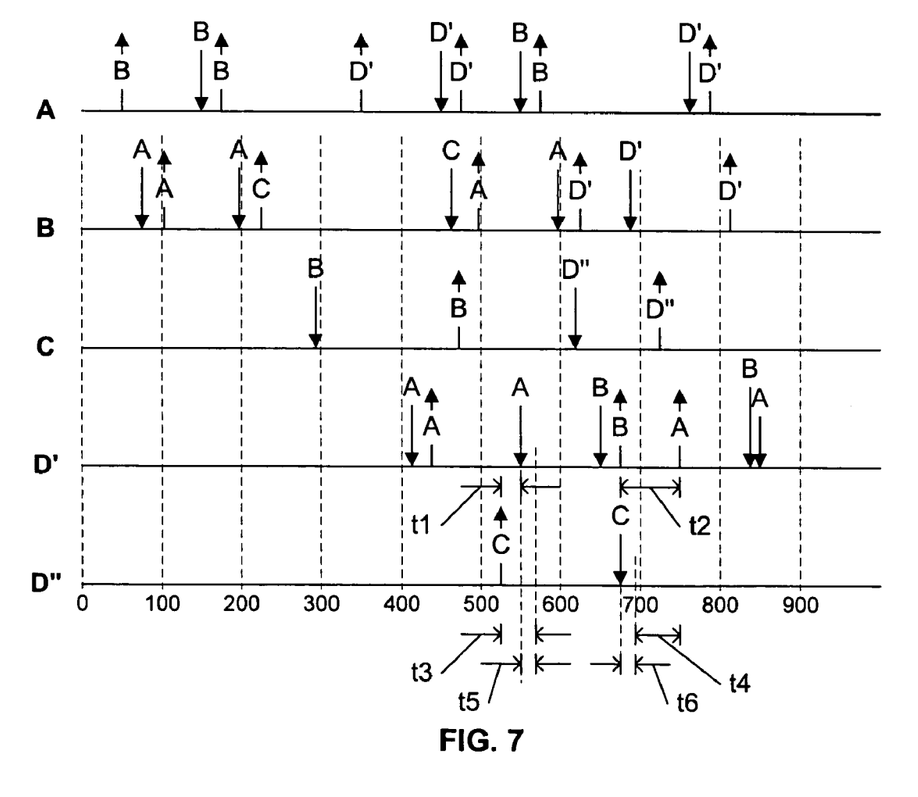
FIG. 7 illustrates an example timing diagram of sample traffic among multiple nodes in the network of FIG. 6.

FIG. 7 illustrates an example timing diagram that corresponds to the example timing diagram of FIG. 2, except that two independent flows D' and D" are illustrated, and the communications from A and B are illustrated as flowing to D' and the communication from C is illustrated as flowing to D".

Applying the above discussed synchronization process of FIG. 4 to the illustrated traffic flow of FIG. 7 will provide for a feasible set of offsets for each timing base A, B, C, D', and D", based on the constraint of feasible transmission and reception times. However, these offsets will not reflect constraints imposed based on feasible causation and reaction times, as discussed further below.

Referring to FIGS. 1-3, there appears to be an order to the traffic flow at node D. For example, node D might be a server that is connected to a database at node C. At time 410, node D receives a message (AD-83) from node A, and at time 440 node D responds with a message (DA-44) to node A. In this hypothetical example, this interchange may correspond to a request-to-send, clear-to-send exchange to acknowledge that node D is available to receive a data access request from node A. The hypothetical data access request (AD-97) is received at node D at time 550, and node D initiates a request (DC-88) to the database at node C at time 577. At time 723, node D receives the requested data (CD-33) from node C, and at time 752, node D forwards the data (DA-87) to node A. Because all of the above cause-and-effect actions occur at node D and are logged in the trace files using a single clock (the clock at 110D), there cannot be an effect (an answer to a request) that is logged as having occurred before the cause (the request) was received.

In FIGS. 6 and 7, the disassociation of the two tracers 110D' and 110D" can result in anomalous and/or inconsistent timing effects, as illustrated in FIG. 7. Note that the above hypothetical request for data from node A is received at node D' at approximately time 550 (measured by 110D'), but the hypothetical response to this request (the request for the data from node D" to node C) is transmitted to node C from node D" at t1 time units before time 550 (measured by 110D"). That is, based on the independent clocks, it appears that node D" responded to a request for data before the request was received at node D'. Note also that although the times at nodes D' and D" have some association based on the links through nodes B and C, the bounds placed on these nodes based on transmit/receive time constraints using the process of FIG. 4 will not necessarily provide the required shift of times at nodes D' and D" to avoid this inconsistency with regard to responding to a request before the request is made.

In accordance with this invention, the system is configured to impose cause-effect constraints by establishing "virtual links" between nodes. These virtual links are modeled and processed as edges in the above detailed clock-synchronization process of FIG. 4.

In the example of FIGS. 6-7, a virtual link between nodes D' and D" is defined, and the lower bound (ELB) on edge D'D" is defined to be not less than −t1. Similarly, because node D' cannot forward the data to node A before the data is received from node C at node D", the upper bound (EUB) on this edge D'D" is defined to be not more than +t2. Edge D"D' will have corresponding inverse bounds of (−t2, +t1). That is, using this technique, and defining an effect packet to be a packet that is generated in response to a causing packet, the ELB and EUB of each virtual edge are defined to assure that an effect packet is never transmitted before its corresponding causing packet is received.

This cause-and-effect constraint propagation can be further enhanced by the inclusion of a "reaction time" in the aforementioned upper and lower bounds. That is, if the generation of an effect packet is known to require a minimum amount of time after receipt of the causing packet, this additional constraint can be imposed on the above detailed synchronization of clocks by including this time in the determination of each edge's lower and/or upper bounds. This is illustrated in FIG. 7, wherein a minimum reaction time t5 is illustrated between the receipt of a causing packet at node D' from node A, and the generation of an effect packet from node D" to node C. Similarly, a minimum reaction time t6 is illustrated between the time of receipt of the data from node C at node D" and the generation of an effect packet from node D' to node A. In this example, the lower bound on edge D'D" is the total time t3 between the reported generation of the request to node C at node D" and the time of receipt of the request from node A at node D' plus the minimum reaction time t5. Similarly, the upper bound on edge D'D" is the total time t4 between the reported time of receipt of the data from node C at node D" plus the minimum reaction time t6 to create the response to node A, and the reported time of forwarding the response to node A.

The determination of the cause-effect bounds and, optionally, the reaction time bounds, will generally be a manual process, although automation tools can be provided to facilitate an identification of cause and effect relationships, using for example, pattern matching techniques. For example, it may be noticed, manually or automatically, that in the example network of FIG. 7, packets are transmitted to node C from node D" whenever a pair of requests are received at node D from node A. Similarly, it may be noticed that transmissions from D' to node A occur in the time vicinity of apparent responses from node C at node D".

Although the invention is described using an example wherein actual logged events are used to determine upper and lower bounds associated with a virtual link, one of ordinary skill in the art will recognize that the bounds used for the virtual link can be established based on a knowledge of the network and data collection facilities. For example, if it is known that two trace devices 110 derive their clock from the same source, the upper and lower bounds for each edge can be pre-defined to be zero, or pre-defined to the estimated variance of the clock at these two devices, caused, for example, by different propagation delays of the clock to each device.

Note that the above cause-effect and reaction time bounding technique can be applied to other example disassociations, including the total disassociations that are typically caused by a firewall. Firewalls are designed to isolate segments of a network from each other. As such, a network with a firewall will be partitioned into two sub-networks. During the propagation of constraints detailed in FIG. 4, the constraints imposed by choosing a root note are not propagated beyond the sub-network containing the root node, because no node in the sub-network has a "neighbor" node in the other sub-network. By creating a virtual link/edge between the two sides of a firewall, a "neighbor" node in the other sub-network (the sub-network at the other side of the firewall) is created, and the timing constraints of each sub-network are propagated to each other. As noted above, the parameters for this virtual link/edge may be determined/estimated from actual traffic, or from the inherent characteristics of the firewall device and the associated trace collection devices. In like manner, a series of complex network links for which a limited amount of trace information is available may be modeled as a collection of virtual links between the trace collection points. These and other uses of virtual links will be evident to one of ordinary skill in the art.

In accordance with another aspect of this invention, the time bases of the nodes can be adjusted for other factors besides a direct time-shift. For example, in the process described above, it is assumed that each time base operates at the same rate as each other time base. If one time base is running faster than the 'standard'/'common' rate, its time-shift will not be constant, and will continually increase. Similarly, a slower-running time base will have a continually decreasing time-shift. In a straightforward embodiment, curve-fitting techniques are applied to the determined time differences between packets transmitted from one node and received at another. Ideally, the slope of a line that best-fits the differences would be zero. If a time-drift is present, the slope of the times based on the transmissions from a first node to a second node should be equal and opposite to the slope of the times based on the transmissions from the second node to the first node. Adjusting each recorded time at the first node by the determined slope will adjust the effective rate of the time base at the first node to correspond to the rate of the time base at the second node.

Figure 8:
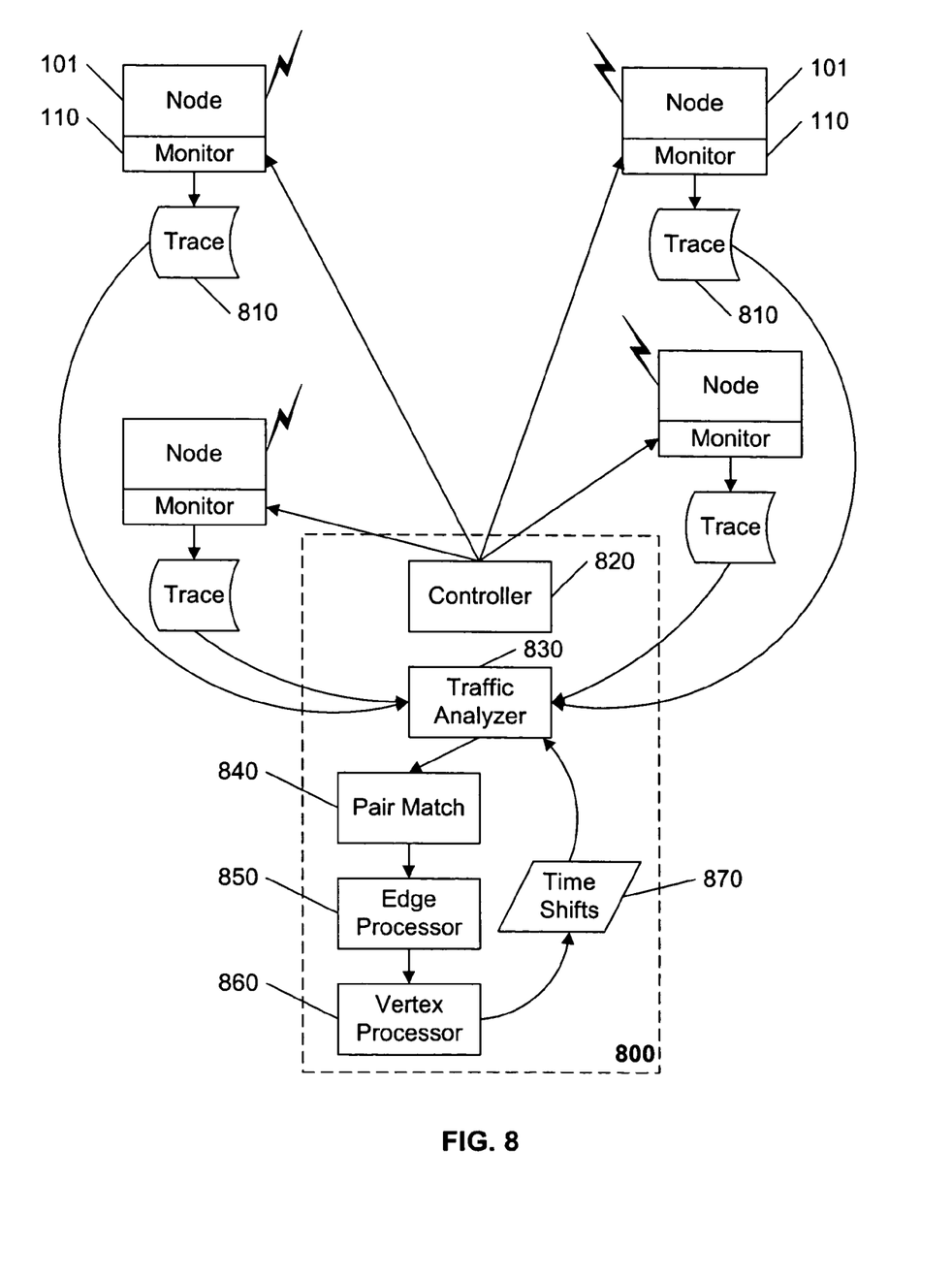
FIG. 8 illustrates an example block diagram of a system for determining a common time base among multiple nodes in a network in accordance with this invention.

FIG. 8 illustrates an example block diagram of a traffic analysis system 800 that includes components for determining a common time base among multiple nodes 101 in a network in accordance with this invention. Monitors 110 at each node provide a record 810 of communication events, including a record of each transmission and reception at the node 101. Optionally, the monitor 110 may include a filter that selects only transmissions and receptions that satisfy a given criteria for recording, such as only transmissions and receptions to and from particular nodes 101 or classes of nodes 101. Preferably, the monitors 110 are controlled by a controller 820, to assure that the monitors 110 are each enabled for the same monitoring period. Alternatively, each monitor 110 could be independently controlled; and, if necessary, select segments of the records 810 from each node can be identified as corresponding to a concurrent time period.

A traffic analyzer 830 collects the information from the records 810 of each node, corresponding to the time period that is to be analyzed, hereinafter termed traces 810. Because the time bases used to record the communications in the traces 810 are not necessarily synchronized, the traffic analysis system 800 includes components 840-860 for determining a set of time shifts 870 that can be applied to the set of traces 810 to provide a common time base.

A pair matching component 840 identifies each transmission in each trace 810 that has a corresponding reception in another trace 810. This pairing may be automated, semi-automated, or a completely manual process, and may be based on identifiers associated with each message, or may be based on some or all of the content of each message, or a combination of both, as noted above. The pair matching component 840 may include a filter that pairs only messages that satisfy a given criteria, such as messages transmitted or received to and from particular nodes, messages having particular identifiers, particular priorities, and so on.

An edge processor component 850 analyzes the transmission-reception pairs provided by the pair matching component 840 to identify pairs of nodes that communicate with each other (heretofore termed "neighbor" nodes), and to determine the bounds on the communications path between each node of each pair, based on the delays between recorded receptions and corresponding recorded transmissions (heretofore termed "edge" bounds). The edge processor component 850 also accepts as input any defined virtual nodes for establishing "virtual" neighbors, as discussed above. In the example embodiments above, these edge bounds define the bounds on the difference between the time bases at each node of the pair such that a reception cannot occur before a transmission, as well as the edge bounds produced by a cause-and-effect relationship among activities at the nodes. If other constraints are known, such as a geographic distance between each node of the pair, or the minimum reaction time for generating effect packets from causing packets, the edge bounds can be further refined to assure that a reception cannot occur before the transmission time plus a minimum delay time.

A vertex processor 860 determines the constraints imposed on each node's time base, based on the edge bounds defined for the links between the nodes. In a preferred embodiment, these constraints are determined by iteratively constraining a selected node to a selected value within its determined time-shift bounds, and propagating the effect that this constraint has on the time-shift bounds of each of the other nodes, until a set of selected time-shift values 870 corresponding to all of the nodes is determined.

The traffic analyzer 830 applies the set of time-shift values 870 to each record in each of the traces 810, thereby normalizing all of the traces 810 to a common time base, so that subsequent analyses can be performed using this common time base.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

We claim:

1. A method of providing a common time base to time measurements at a plurality of nodes in a network, comprising:

defining a plurality of pairs of nodes based on records of communication between the pairs of nodes, adding one or more additional pairs of nodes to the plurality of pairs based on one or more defined virtual links between the nodes of each additional pair of nodes, determining upper and lower edge bounds on time bases of pairs of nodes of the plurality of nodes, based on the records of communications between pairs of nodes, the records being based on each of the time bases at each node of each pair of nodes, and defined characteristics of the one or more virtual links, and determining a set of time shifts for the time bases at the plurality of nodes, to place the time measurements at the plurality of nodes consistent with the common time base, based on the upper and lower bounds on the time bases of the pairs of nodes.

2. The method of claim 1, including determining the communications within at least one pair of the pairs of nodes, based on records of transmissions from a first node of the pair and records of corresponding receptions at a second node of the pair.

3. The method of claim 1, wherein each lower bound is based on receptions of messages at a node and each corresponding upper bound is based on transmissions of messages from the node.

4. The method of claim 1, wherein:

the upper edge bound is substantially equal to a minimum value of all differences between a time of reception of each message of each pair at a first node of the pair and a time of transmission from a second node of the pair, and the lower edge bound is substantially equal to a negative of a minimum value of all differences between a time of reception of each message of each pair at the second node and a time of transmission from the first node.

5. A method of providing a common time base to time measurements at a plurality of nodes in a network, comprising:

determining edge bounds on time bases of a plurality of pairs of nodes of the plurality of nodes, based on records of communications between a first set of pairs of nodes of the plurality of pairs of nodes, the records being based on each of the time bases at each node of each pair of nodes, and based on characteristics of at least one defined virtual link between nodes of a second set of at least one pair of nodes of the plurality of pairs of nodes, and determining a set of time shifts for the time bases at the plurality of nodes, to place the time measurements at the plurality of nodes consistent with the common time base, based on the bounds on the time bases of the pairs of nodes, wherein:

the edge bounds include a first set of bounds on the pairs of the first set and a second set of bounds on the at least one pair of the second set;

the first set of bounds on each pair of the first set includes at least one of:
- a first bound that is based on communications from a first node of the pair to a second node of the pair, and
- a second bound that is based on communications from the second node to the first node; and the second set of bounds on each pair of the second set is based on the characteristics of the corresponding virtual link.

6. The method of claim 5, wherein the first and second nodes of each pair are defined as neighbors of each other, and determining the set of time shifts includes:
- selecting a time shift at a root node,
- determining bounds on the time shifts of each neighbor of the root node based on the edge bounds on the time bases of each pair of nodes that includes the root node, and
- determining bounds on the time shifts of each neighbor of each neighbor of the root node, based on the edge bounds of the time bases of each pair of nodes that includes each neighbor of the root node.

7. The method of claim 6, wherein determining the set of time shifts further includes selecting another node as the root node, selecting another time shift at the root node based on the bounds on the time shift of the root node, and repeating the method of claim 6.

8. The method of claim 5, wherein the first bound of the first set of bounds corresponds to a minimum difference between a time of reception at the second node and a time of transmission from the first node.

9. The method of claim 8, wherein the second bound of the first set of bounds corresponds to a minimum difference between a time of reception at the first node and a time of transmission from the second node.

10. The method of claim 5, wherein a first bound of the second set of bounds includes a reaction time for providing a first effect event in response to receipt of a first causing event.

11. The method of claim 10, wherein a second bound of the second set of bounds includes a reaction time for providing a second effect event in response to receipt of a second causing event.

12. The method of claim 5, wherein the second bound of the first set of bounds corresponds to a minimum difference between a time of reception at the first node and a time of transmission from the second node.

13. The method of claim 5, wherein the second set of bounds include at least one of:
- a first bound that is based on receiving a first causing event at a first node of the pair that causes a first effect event at a second node of the pair, and
- a second bound that is based on receiving a second causing event at the second node that causes a second effect event at the first node.

14. The method of claim 13, wherein the second bound of the second set of bounds includes a reaction time for providing the second effect event in response to receipt of the second causing event.

15. The method of claim 5, further including determining the communications within at least one pair of the pairs of nodes, based on records of transmissions from a first node of the pair and records of corresponding receptions at a second node of the pair.

16. A method of providing a common time base to a plurality of nodes in a network, comprising:
- creating a trace at each node of the plurality of nodes, each trace including a record of packets communicated via each node based on a time base associated with each node;
- determining a plurality of packet pairs, each packet pair of the plurality of packet pairs corresponding to a transmission of a packet from one node of a pair of nodes and a reception of the packet at another node of the pair of nodes, based on the trace associated with each node;
- determining a plurality of pairs of nodes, based on
  - the plurality of packet pairs, and
  - at least one defined virtual link between two nodes of the plurality of nodes that are not associated with each other in the plurality of packet pairs;
- determining edge constraints associated with each pair of the pairs of nodes, based on:
  - a recorded time of each transmission and reception of each packet pair, as determined from the trace associated with each node of the pair, and
  - a cause and effect relationship between events at one or more nodes of the at least one virtual link; and
- determining a set of time shifts, corresponding to time shifts that are feasible for being applied to the recorded time of each transmission and reception of each packet at each node, based on the edge constraints, to provide feasible transmission and reception times relative to the common time base.

17. The method of claim 16, wherein determining the edge constraints associated with at least one pair includes determining:
- a lower limit associated with the transmission of packets from a first node of the pair of nodes to a second node of the pair of nodes, and
- an upper limit associated with transmitting packets from the second node to the first node.

18. The method of claim 17, wherein the upper limit corresponds to a minimum difference between a time of reception at the first node and a time of transmission from the second node, and the lower limit corresponds to a minimum difference between a time of reception at the second node and a time of transmission from the first node.

19. The method of claim 17, wherein determining the edge constraints associated with at least one pair includes determining an upper limit associated with the production of effect packets at a first node of the at least one virtual link based on receipt of causing packets at a second node of the at least one virtual link.

20. The method of claim 19, wherein determining the edge constraints associated with the at least one pair includes determining a lower limit associated with the production of effect packets at the second node based on receipt of causing packets at the first node.

21. The method of claim 16, wherein determining the edge constraints associated with at least one pair includes determining an upper limit associated with the production of effect packets at a first node of the at least one virtual link based on receipt of causing packets at a second node of the at least one virtual link.

22. The method of claim 21, wherein determining the edge constraints associated with the at least one pair includes determining a lower limit associated with the production of effect packets at the second node based on receipt of causing packets at the first node.

23. The method of claim 21, wherein determining the set of time shifts includes:
- selecting a time shift at a root node, and determining bounds on the time shifts at each node that is linked to the root node, by propagating constraints imposed by the time shift at the root node, based on the edge constraints associated with each pair of nodes that link each node to the root node.

24. The method of claim 16, wherein determining the set of time shifts includes:
selecting a time shift at a root node, and
determining bounds on the time shifts at each node that is linked to the root node, by propagating constraints imposed by the time shift at the root node, based on the edge constraints associated with each pair of nodes that link each node to the root node.

25. The method of claim 24, wherein determining the set of time shifts includes:
iteratively selecting a time shift at a select node, based on the bounds on the time shift at the select node, and
re-determining the bounds on the time shifts at each node that is linked to the select node, by propagating constraints imposed by the time shift at the select node, based on the edge constraints associated with each pair of nodes that link each node to the select node.

26. A computer program embodied on a computer-readable medium that, when executed on a computer system, causes the computer system to:
receive records of communications from each node of a plurality of nodes, the records being dependent upon a time base at each node,
determining a plurality of pairs of nodes based on the records of communications,
determining at least one additional pair of nodes of the plurality of nodes based on at least one defined virtual link between nodes of the additional pair of nodes,
determine edge constraints associated with the time bases between the pairs of nodes, based on the records of communications at each node, and based on cause and effect relationships between communications at nodes of the at least one virtual link, and
determine bounds on the time base at each node, based on the edge constraints associated with the time bases between the pairs of nodes.

27. The computer program of claim 26, that further causes the computer system to determine a time shift associated with each node, based on the bounds on the time base at each node, so as to provide a common time base among the nodes.

28. The computer program of claim 26, wherein determining the bounds on the time base at each node includes:
selecting a time shift at a root node, and
determining the bounds on the time base at each node that is linked to the root node by propagating constraints imposed by the time shift at the root node to each node based on the edge constraints associated with the time bases between pairs of nodes that link each node to the root node.

29. The computer program of claim 28, wherein determining the bounds on the time base at each node further includes:
selecting a time shift at a select node, based on the bounds on the time base at the select node, and
re-determining the bounds on the time base at each node that is linked to the select node by propagating constraints imposed by the time shift at the select node to each node based on the edge constraints associated with the time bases between pairs of nodes that link each node to the select node.

30. The computer program of claim 26, wherein determining the edge constraint associated with at least one pair of nodes includes:

determining a first constraint based on records of transmissions from a first node of the pair of nodes and records of corresponding receptions at a second node of the pair of nodes, and
determining a second constraint based on records of transmissions from the second node and records of corresponding receptions at the first node.

31. The computer program of claim 30, wherein the first constraint corresponds to a minimum difference between times of reception at the second node and times of corresponding transmissions from the first node, and the second constraint corresponds to a minimum difference between times of reception at the first node and times of corresponding transmissions from the second node.

32. The computer program of claim 30, wherein determining the edge constraint associated with at least one pair of nodes includes determining a first constraint based on records of transmissions from a first node of the at least one virtual link in response to receptions at a second node of the at least one virtual link.

33. The computer program of claim 32, wherein determining the edge constraint associated with the at least one pair of nodes includes determining a second constraint based on records of transmissions from the second node in response to receptions at the first node.

34. The computer program of claim 26, wherein determining the edge constraint associated with at least one pair of nodes includes determining a first constraint based on records of transmissions from a first node of the at least one virtual link in response to receptions at a second node of the at least one virtual link.

35. The computer program of claim 34, wherein determining the edge constraint associated with the at least one pair of nodes includes determining a second constraint based on records of transmissions from the second node in response to receptions at the first node.

36. A traffic analysis system comprising:
a traffic analyzer that is configured to analyze a plurality of records of transmissions and receptions at a plurality of nodes in a network, each record of transmissions and receptions at each node being based on a time base corresponding to each node;
a pair matcher that is configured to facilitate an identification of transmission-reception pairs, each transmission-reception pair corresponding to a transmission from a node and a corresponding reception at another node, based on the plurality of records;
an edge processor that is configured to:
identify a plurality of node-pairs corresponding to a pair of nodes that provide one or more transmission-reception pairs, and at least one additional node-pair based on at least one defined virtual link between the nodes of the at least one additional node-pair, and
determine edge bounds associated with each node-pair, the edge bounds corresponding to bounds on a relative time-shift of each node of node-pair relative to each other; and
a vertex processor that is configured to determine a set of time-shifts that are feasible for being applied to the time base of each node so as to provide a common time base among the nodes, based on the edge bounds associated with each node-pair.

37. The traffic analysis system of claim 36, further including a controller that is configured to control traffic monitors at one or more of the plurality of nodes to facilitate creation of one or more of the records of transmissions and receptions.

38. The traffic analysis system of claim 36, wherein the vertex processor determines the set of time-shifts by defining an initial set of values for constraints on the time-shift of each node, and iteratively:
- selecting the time-shift at a select node based on the constraints on the time-shift of the select node, and
- determining the constraints on the time-shift of each other node, based on the time-shift of the select node and the edge bounds associated with each node-pair that couples the select node to each other node.

39. The traffic analysis system of claim 38, wherein the edge bounds associated with at least one node-pair include:
- an upper bound that is substantially equal to a minimum value of all differences between a time of reception of each transmission-reception pair at a first node of the node-pair and a time of transmission of the transmission-reception pair from a second node of the node-pair, and
- a lower bound that is substantially equal to a negative of a minimum value of all differences between a time of reception of each transmission-reception pair at the second node and a time of transmission of each transmission-reception pair from the first node.

40. The traffic analysis system of claim 39, wherein the edge bounds associated with at least one other pair of nodes includes an upper bound that is based on records of transmissions from a first node of the at least one virtual link in response to receptions at a second node of the at least one virtual link.

41. The traffic analysis system of claim 40, wherein the edge bounds associated with the at least one other pair of nodes includes a lower bound that is based on records of transmissions from the second node of the at least one virtual link in response to receptions at the first node of the at least one virtual link.

42. The traffic analysis system of claim 40, wherein the constraints on the time-shift of each node includes a lower constraint and an upper constraint, and determining the constraints of the time shift of a first node of a node-pair includes:
- determining a first sum of the lower constraint of a first node of the node-pair and the lower bound of the node-pair,
- setting the lower constraint of the first node to the first sum, if the first sum is greater than the lower constraint of the first node,
- determining a second sum of the upper constraint of the second node of the node-pair and the upper bound of the node-pair,
- setting the upper constraint of the first node to the second sum, if the second sum is less than the upper constraint of the first node.

43. The traffic analysis system of claim 39, wherein the constraints on the time-shift of each node includes a lower constraint and an upper constraint, and determining the constraints of the time shift of a first node of a node-pair includes:
- determining a first sum of the lower constraint of a first node of the node-pair and the lower bound of the node-pair,
- setting the lower constraint of the first node to the first sum, if the first sum is greater than the lower constraint of the first node,
- determining a second sum of the upper constraint of the second node of the node-pair and the upper bound of the node-pair,
- setting the upper constraint of the first node to the second sum, if the second sum is less than the upper constraint of the first node.

44. The method of claim 36, wherein the at least one additional node-pair corresponds to a pair of nodes having a cause and effect relationship between transmissions and receptions at the nodes.

\* \* \* \* \*